United States Patent [19]

Lelu et al.

[11] Patent Number: 4,638,735
[45] Date of Patent: Jan. 27, 1987

[54] COMBUSTION INHIBITOR BASED ON AN ALIPHATIC POLYURETHANE ELASTOMER FOR A PROPELLANT, AND BLOCK COATED WITH THIS INHIBITOR

[75] Inventors: André E. Lelu, Saint-Medard en Jalles; Jean R. Grignon, Pessac; Bruno F. Gonthier, Saint-Medard en Jalles; Jean-Michel Tauzia, Caychac, all of France

[73] Assignee: Societe Nationale des Poudres et Explosifs, Paris, France

[21] Appl. No.: 735,368

[22] Filed: May 17, 1985

[30] Foreign Application Priority Data

May 17, 1984 [FR] France ................................ 84 07657

[51] Int. Cl.$^4$ ...................... C06B 45/28; C06B 45/22; C06B 45/18
[52] U.S. Cl. ........................................ 102/290; 149/3; 149/10; 149/11; 149/19.4; 149/19.91; 149/97; 523/180
[58] Field of Search ................................ 252/609, 350; 106/18.11, 15.05; 169/45; 149/10, 98, 3,11, 149/19.4, 19.91, 97; 521/906; 102/290

[56] References Cited

U.S. PATENT DOCUMENTS

| 3,134,742 | 5/1964 | Wismer et al. | 252/609 |
| 3,924,405 | 12/1975 | Cohen et al. | 149/20 X |
| 4,092,186 | 5/1978 | Gordon et al. | 149/10 |
| 4,156,066 | 5/1979 | Gould | 106/15.05 |
| 4,187,215 | 2/1980 | Wrightson | 102/290 X |
| 4,220,729 | 9/1980 | Uchida et al. | 521/906 |
| 4,232,085 | 11/1980 | Carlstrom et al. | 521/906 |
| 4,232,608 | 11/1980 | Wrightson | 102/290 |
| 4,246,360 | 1/1981 | Brown et al. | 521/906 |
| 4,284,442 | 8/1981 | Voigt, Jr. | 149/19.4 |
| 4,514,524 | 4/1985 | Fesman | 252/609 |
| 4,532,287 | 7/1985 | Bill et al. | 252/609 |
| 4,536,235 | 8/1985 | Lelu et al. | 149/98 X |

FOREIGN PATENT DOCUMENTS 0104346 8/1980 Japan .................................. 252/609

Primary Examiner—Peter A. Nelson
Assistant Examiner—S. Wolffe
Attorney, Agent, or Firm—Cushman, Darby & Cushman

[57] ABSTRACT

The invention relates to a combustion inhibitor composition intended to cover partly the surface of blocks of double-base propellant. The inhibitor composition of the invention includes an aliphatic polyurethane obtained by the reaction of at least one polyisocyanate with a mixture of at least one polyetherpolyol containing at least three hydroxy groups per molecule and at least one polymer containing two hydroxy groups per molecule. This difunctional polymer is chosen from lactone polymers, such as poly-$\epsilon$-caprolactone and polytetrahydrofuran. The inhibitor composition may also contain gasifiable fillers and an aliphatic plasticizer. The composition has good discreteness properties, while retaining excellent mechanical properties. The present invention has particular application in the field of solid weapon propulsion.

9 Claims, No Drawings

COMBUSTION INHIBITOR BASED ON AN ALIPHATIC POLYURETHANE ELASTOMER FOR A PROPELLANT, AND BLOCK COATED WITH THIS INHIBITOR

The present invention relates to a combustion inhibitor composition for a propellant, based on an aliphatic polyurethane elastomer.

It relates more particularly to a combustion inhibitor composition having high discreteness and based on an aliphatic polyurethane elastomer obtained by the reaction of at least one polyisocyanate with a mixture of oxygenated polymers.

Combustion inhibitors are materials employed to cover the surfaces of a block of propellant, except for the combustion surface. Thus, these materials protect the surfaces of the block against any unintended ignition which could occur, especially under the effect of the hot gases produced by the combustion of the block.

The combustion inhibitors therefore make it possible to control the combustion of a block of propellent by making it possible to determine and preserve a zone of uniform combustion while the latter runs its course.

In the case of the weapons referred to as "tactical", which are generally guided from the firing post, it is necessary that the combustion of the propellant block, which enables the weapon to travel, does not produce fumes or gases which would obscure the rear zone of the weapon, thus preventing its guidance by the firing post.

This condition, referred to as "discreteness", is characterised by the degree of transparency of the gases emitted to the guidance waves, particularly infrared and visible radiations.

The propellants which are discrete by their nature are propellants known as "double-base", the combustion gases of which contain very few or no solid particles, and are consequently transparent to the radiations.

This condition of discreteness is also applicable to the materials employed to produce the inhibition of the blocks of "double-base" propellant.

For an inhibitor to be discrete it is necessary that the material employed satisfies several requirements which may appear to be contradictory.

Some of these requirements are, for example:

a longitudinal and transverse transparency to the radiations of the gases produced by the combustion, to allow the weapon to be guided;

an endothermic decomposition of the inhibitor layer in contact with the hot gases in order to "cool" this layer to the maximum so as to improve its thermal resistance;

a uniformity of continuous combustion of the propellant over the entire combustion surface and, particularly, absence of a hypervelocity effect on the side edges of the propellant block;

absence of migration of the nitroglycerine present in the "double-base" propellant.

To satisfy these requirements, a combustion inhibitor must therefore have, in particular, the following properties:

resistance to nitroglycerine migration,
no emission of obscuring fumes during the combustion of the propellant,
the ensuring of good adhesion to the propellant block.

A first solution has been offered to meet these requirements, which consists in using a material which is ablated during the combustion of the propellant, producing transparent gases. This material is thus "gasifiable" under the effect of the hot gases produced by the combustion of the propellant.

The second solution offered consists in the use of materials which have excellent thermal behaviour, such as materials with a silicone binder, which remain in the combustion chamber and therefore do not release obscuring particles.

The inhibitor compositions of the present invention correspond to the materials of the first solution, and are therefore materials referred to as gasifiable.

Such gasifiable materials have already been offered, particularly by French Pat. No. 2,275,425, in which the material consists of an aliphatic polyurethane based on a polyetherpolyol, an aliphatic polyisocyanate and a cooling filler.

However, in view of the affinity of the aliphatic polyurethane for nitroglycerine, it was necessary to insert between the inhibitor and the propellant a barrier layer consisting of a polyurethane based on a triisocyanate, to produce a layer containing an extremely tightly-knit lattice.

In order to dispense with this barrier layer, it has been proposed in French Pat. No. 2,444,689 to increase the degree of crosslinking of the polyurethane material by employing polyols of low molecular weight.

The radiation transparency characteristics of these materials still appear to be insufficient, and edge effects which are still significant remain during the combustion in contact with some compositions.

The subject of the present invention is combustion inhibitor compositions of the type of the known compositions based on an aliphatic oxygenated polyurethane, but having improved characteristics of transparency to radiations and of control of propellant combustion.

To this end, the invention offers a combustion inhibitor composition for a solid propelling composition known as a propellant, based on an aliphatic polyurethane obtained by the reaction of at least one polyisocyanate with a mixture of at least one polyetherpolyol containing at least three hydroxy groups per molecule and at least one polymer containing two hydroxy groups per molecule. According to the invention, the difunctional polymer is chosen from lactone polymers and tetrahydrofuran polymers, the respective molar fractions of the difunctional polymer and of the polyfunctional polyetherpolyol are determined by the following relationship:

$$R = \frac{Mx \cdot \gamma x}{fx} \cdot \frac{fy}{My \cdot \gamma y} > 1$$

in which:

$Mx$, $\gamma x$ and $fx$ respectively denote the molecular weight, the molar fraction and the hydroxy functionality of the difunctional polymer; and $My$, $\gamma y$, $fy$ respectively denote the molecular weight, the molar fraction and the hydroxy functionality of the polyetherpolyol.

The molar fractions $\gamma x$, $\gamma y$ denote the concentration of the polyols in the polyurethane mixture formed by the polyols and the diisocyanate. The hydroxy functionality of the polyether polyol or of the difunctional polymer means the number of hydroxyl groups per molecule of the polymer.

Furthermore, the composition of the invention may optionally contain a gasifiable organic filler and/or a plasticizer.

Preferably, the polyetherpolyols have a functionality of three and a molecular weight of between approximately 400 and approximately 4500, advantageously of the order of 400 to 1000.

According to another characteristic of the invention, the lactone polymers have a molecular weight of between approximately 500 and approximately 3000, advantageously between 1100 and 1700.

As for the tetrahydrofuran polymers, these have a molecular weight of between approximately 600 and approximately 2000, preferably of the order of 1000.

The compositions of the present invention are characterised by high discreteness. Furthermore, their melting point is higher than that of the compositions consisting of a polyurethane based solely on polyetherpolyols. As a result of this, during the combustion of the propellant, with a combustion inhibitor according to the present invention, only an ablation phenomenon of this inhibitor is produced, whilst with an inhibitor consisting of a polyurethane based solely on polyetherpolyols, in addition to the phenomenon of ablation of the inhibitor, a melting of the latter is observed, which results in flows in the combustion chamber capable of giving rise to irregularities in the combustion of the block, and a reduction in the radiation transparency due to the entrainment of liquid particles in the combustion gases.

Aliphatic polyurethanes are intended to mean polyurethanes which contain substantially no aromatic moieties. However, these polyurethanes may contain a small proportion of aromatic moieties, but this proportion should not exceed 10% in order not to modify the discreteness characteristics of the inhibitor.

In order for the compositions of the invention to be gasifiable, the polyurethanes must be oxygenated. The proportion of the number of carbon atoms to the number of oxygen atoms present in the polyurethane is below 6 and advantageously between 4 and 5.5.

The polyetherpolyols which are suitable for the invention include polyethylene glycol, polypropylene glycol, polypropylene ethylene glycol, polytetramethylene glycol and the like, and the products of addition of polyoxypropylene glycol to ethylene glycol, diethylene glycol, propylene glycol, glycerol, sorbitol, pentaerythritol, trimethylolpropane, for example; it is also possible to use polyesterpolyols derived from dicarboxylic acids such as adipic, succinic or sebacic acids, and from low molecular weight glycols such as ethylene glycol, propylene glycol, diethylene glycol, 1,4-butanediol, 1,6-hexanediol, or the like.

The lactone polymers which are suitable for the invention are polymers formed from polyfunctional initiators by successive ring opening of lactone monomers.

The lactones suitable for the invention correspond to the formula:

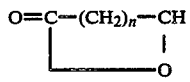

n being below or equal to 4.

Among these lactone polymers, mention may be made of poly-ε-caprolactone or poly-γ-butyrolactone.

The tetrahydrofuran polymer which is suitable is polytetrahydrofuran.

The polyisocyanates which are suitable for the invention are aliphatic diisocyanates such as 4,4'-diisocyanatodicyclohexylmethane (MDCI), 1,6-diisocyanate-2,2,3-trimethylhexane, isophorone diisocyanate, hexamethylenediisocyanate or the like.

The crosslinking is carried out in the presence of catalysts such as, for example, those based on tin, such as dibutyltin diacetate, or dibutyltin dilaurate.

The proportion of the NCO groups to the OH groups is preferably 1 or slightly greater. In the preferred embodiment of the invention this proportion is equal to 1.1.

It is also advantageous to add to the composition an aliphatic plasticizer such as, for example, triacetin or tri-n-butyl acetylcitrate.

Up to 50 parts by weight of plasticiser may be added to 100 parts of polyurethane.

The compositions according to the invention may advantageously contain a gasifiable organic filler, this filler having a melting temperature equal to or higher than that of the polyurethane.

The following may be mentioned as suitable fillers, by way of indication: oxamide, ammonium oxalate, polyoxyethylene, polyoxypropylene, polyoxymethylene, and ammonium oxalate polyacetal.

Preferably, these fillers should be non-hygroscopic, to avoid the presence of water, which interferes with the crosslinking of the polymer.

It is preferred to use oxygenated organic fillers having a proportion of the number of carbon atoms to the number of oxygen atoms which is closest to the value 1, in order thus to promote the oxidation reactions relative to the polymerization reactions, and consequently to reduce cinder formation.

The quantity of fillers which can be added may reach 300 parts by weight of these fillers per 100 parts of polyurethane, the limit of this quantity being determined by the castability of the composition and by the minimum mechanical properties which a combustion inhibitor must have.

In the preferred embodiment of the invention, this filler is oxamide, which has a very high melting point (approximately 400° C.).

Furthermore, it is possible to add to the composition of the invention chain extenders such as low molecular weight glycols such as, for example, 1,4-butanediol, or diamines such as ethylenediamine.

In addition, it is possible to add a very low molecular weight polyol such as, for example, trimethylolpropane.

The quantity of this trimethylolpropane which is added is determined by the required mechanical properties of the inhibitor, and may be as much as 20 parts by weight per 100 parts of polyols.

It is also possible to add to the compositions according to the invention heat-stable organic or inorganic fibres such as polyphenylene terephthalamide fibres marketed by the company Dupont de Nemours under the trade name "Kevlar", for example.

The invention is used in accordance with the procedures usually employed in the field of inhibition of blocks of propellant.

One of these procedures will be described hereafter by way of illustration: a block of double-base propellant is arranged concentrically in a cylindrical mould so as to leave a uniform space between the surface of the block and the inner wall of the mould.

The constituents of the polyurethane according to the invention are mixed using a mixer. The cooling filler, the plasticizer or the fibres, when provision is made for these components or for one of these in the final composition, are also mixed with the constituents of the polyurethane using the mixer.

After the mixture has been homogenized, the propellant block is inhibited by casting the composition in the space provided in the mould or, according to a preferred procedure, by injection-moulding the composition.

The following examples, which are given merely by way of indication, illustrate the invention.

Trials of several inhibitor compositions according to the invention are carried out with the following propellant composition, expressed in percentage by weight:

| | |
|---|---|
| Nitrocellulose | 40.2% |
| Nitroglycerine | 36.5% |
| Triacetin | 8.2% |
| Hexogen | 9.1% |
| Additives: (combustion and polymerization catalysts, ballistic modifiers) | 6% |

The examples of formulations of inhibitor compositions according to the invention are shown in Table 1 below:

inhibited by a layer of these inhibitor compositions 2.5 mm in thickness.

These firings have made it possible to evaluate, on the one hand, the transverse and longitudinal transparency of the gases to radiations, to assess the discreteness of the inhibitor composition, and, on the other hand, the thermal resistance of these compositions, by the determination of the extent of ablation and the visual inspection of the combustion chamber after the firing.

The results are collated in Table 3 below.

TABLE 3

Results of the firing trials

| composition | extent of ablation (%) | transmission transverse (%) | longitudinal (%) |
|---|---|---|---|
| 1 | 20–22 | 91 | 40 |
| 2 | 16,5 | 90 | >40 |
| 3 | 18,5 | 92 | >50 |
| 4 | 18–20 | >90 | >40 |

In addition, a total absence of any trace of melting of the composition in the combustion chamber is found after the firing, in contrast to the inhibitor compositions which do not contain lactone or tetrahydrofuran polymers.

TABLE 1

Formulation of the compositions of the invention

| | test no. | | | | | | | | | | | | | | | |
|---|---|---|---|---|---|---|---|---|---|---|---|---|---|---|---|---|
| | 1 | | | | 2 | | | | 3 | | | | 4 | | | |
| Constituents | γ | % | C/O | R | γ | % | C/O | R | γ | % | C/O | R | γ | % | C/O | R |
| Glycerol polyoxypropylene (1) | 0,340 | 13,80 | | | 0,302 | 13,80 | | | 0,344 | 14,31 | | | 0,228 | 10,90 | | |
| Poly-ε-caprolactone (2) | 0,056 | 12,40 | 5,3 | 1,34 | 0,048 | 12,00 | 5,1 | 1,29 | 0,042 | 9,60 | 5,2 | 1 | | | | |
| PHTF (6) | | | | | | | | | | | | | 0,109 | 13,10 | 5,9 | 1,79 |
| MDCI (3) | 0,605 | 16,10 | | | 0,608 | 18,10 | | | 0,614 | 16,20 | | | 0,634 | 20,10 | | |
| Chain extender (5) | | | | | 0,044 | 0,65 | | | | | | | 0,029 | 10,20 | | |
| Oxamide | | 52,40 | | | | 50,20 | | | | 54,25 | | | | 49,65 | | |
| Triacetin | | 5,20 | | | | 5,00 | | | | 5,30 | | | | 5,45 | | |
| Catalyst (4) | | 0,05 | | | | 0,05 | | | | 0,04 | | | | 0,013 | | |

γ: molar fraction of the constituents in the polyurethane
%: weight % of the constituents in the inhibitor composition
C/O: number of carbon atoms/number od oxygen atoms in the polyurethane $$R = \frac{Mx \cdot \gamma x}{fx} \cdot \frac{fy}{My \cdot \gamma y} \quad \text{(relation I)}$$

(1): Polyetherpolyol marketed by the company "Ugine Kuhlman" under the name "Pluracol 3130" MW = 400
(2): Lactone polymer marketed by the company "Hooker Chemical" under the reference "S10363-55", molecular weight (M) = 2170
(3): Diisocyanate of molecular weight (M) = 262
(4): Dibutyl tin dilaurate
(5): Trimethylolpropane of molecular weight (M) = 134
(6): polytetrahydrofuran of molecular weight (M) = 1000 marketed by the company BASF The mechanical properties of these compositions were evaluated after aging for 15 days at 20° C. The results obtained are collated in Table 2 below.

TABLE 2

Mechanical properties of the compositions of the invention

| composition | Sm (bar) | ε % | E (bar) | $e_r$ (%) |
|---|---|---|---|---|
| 1 | 50 | 8,5 | 607 | 102 |
| 2 | 90 | 8,7 | 1025 | 128 |
| 3 | 55 | 9,2 | 598 | 98 |
| 4 | 34 | 11,5 | 297 | 118 |

Sm: maximum tensile stress at 20° C.
ε: elastic elongation at 20° C.
E: Young's modulus at 20° C.
$e_r$: maximum elongation at break at 20° C.

In addition, low absorption of nitroglycerine in the inhibitor is observed.

These compositions were tested by firing cylindrical blocks (height 200 mm, φ:90 mm) of double-base propellant of the composition given above, the blocks being Consequently the invention offers combustion inhibitor compositions having good discreteness properties and excellent mechanical and combustion control properties.

We claim:

1. Combustion inhibitor composition for a solid propelling composition, said combustion inhibitor composition comprising an aliphatic polyurethane obtained by the reaction of at least one polyisocyanate with a mixture of at least one polyfunctional polyether polyol having a molecular weight between 400 and 4500 containing at least three hydroxy groups per molecule and at least one difunctional polymer containing two hydroxy groups per molecule, the said combustion inhibitor composition incorporating a gasifiable organic filler or an aliphatic plasticizer, wherein the said difunctional polymer is selected from the group consisting of a lactone polymer having a molecular weight between 500 and 3000 and a tetrahydrofuran polymer having a molecular weight between 600 and 2,000, the molar fractions of the difunctional polymer and of the polyfunctional polyether polyol being determined by the following relationship (I):

$$R = \frac{Mx \cdot \gamma x}{fx} \cdot \frac{fy}{My \cdot \gamma y} > 1 \quad \text{(I)}$$

in which

Mx, $\gamma x$ and fx, respectively, denote the molecular weight, the molar fraction and the number of OH groups per molecule of the difunctional polymer; and My, $\gamma y$ and fy, respectively, denote the molecular weight, the molar fraction and the number of OH groups per molecule of the polyfunctional polyether polyol, the proportion of the number of carbon atoms to the number of oxygen atoms in said polyurethane being greater than 4.

2. The inhibitor composition of claim 1, wherein the said difunctional polymer is a lactone polymer having a molecular weight between 1100 and 1700.

3. The inhibitor composition of claim 2, wherein the said lactone polymer is selected from the group consisting of poly-ε-caprolactone and poly-γ-butyrolactone.

4. The inhibitor composition according to claim 1, wherein the said difunctional polymer is a tetrahydrofuran polymer having a molecular weight of the order of 1000.

5. The inhibitor composition according to claim 1, wherein chain extenders selected from the group consisting of low molecular weight glycols and diamines are added to the mixture of said polymers.

6. Inhibitor composition according to claim 1, wherein said composition contains trimethylolpropane.

7. Inhibitor composition according to claim 1, wherein said composition contains heatstable organic or inorganic fibres.

8. Block of propellant incorporating at least on some parts of the faces thereof an inhibitor coating, wherein said coating consists of a layer of the combustion inhibitor composition of claim 1.

9. The inhibitor composition of claim 1 wherein said polyfunctional polyether polyol has a molecular weight between 400 and 1000.

* * * * *